Patented Aug. 12, 1924.

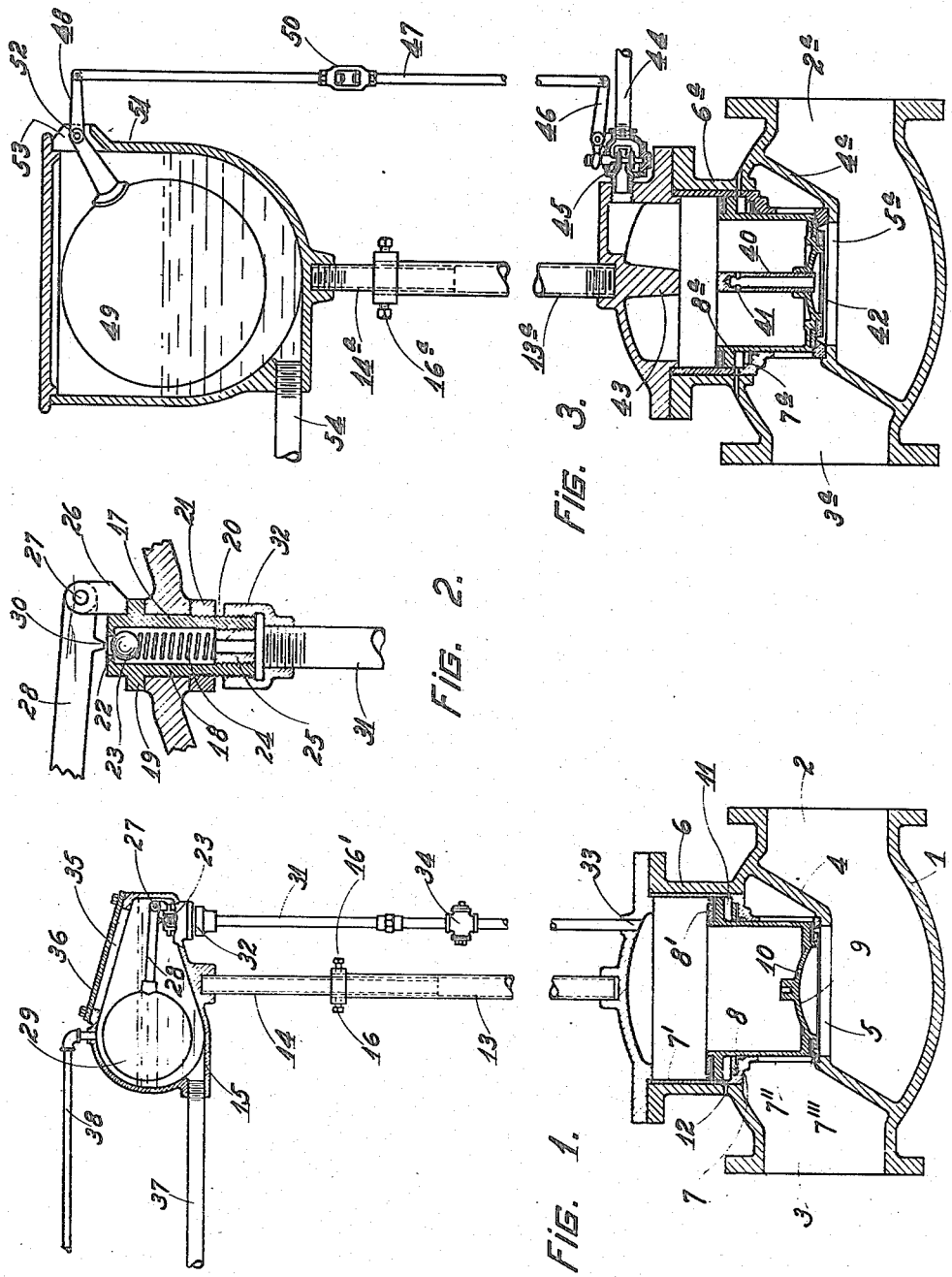

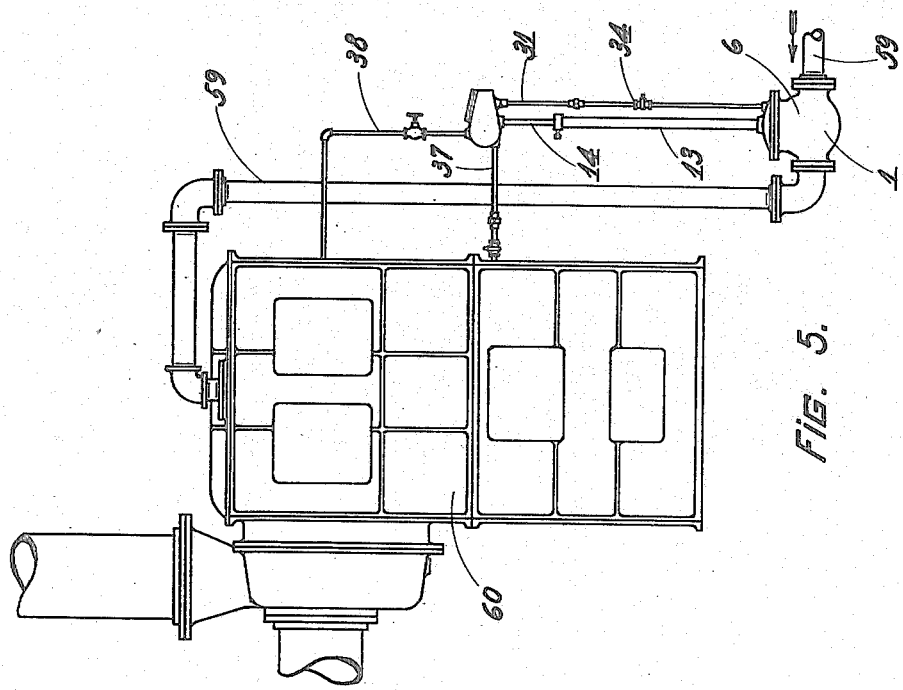
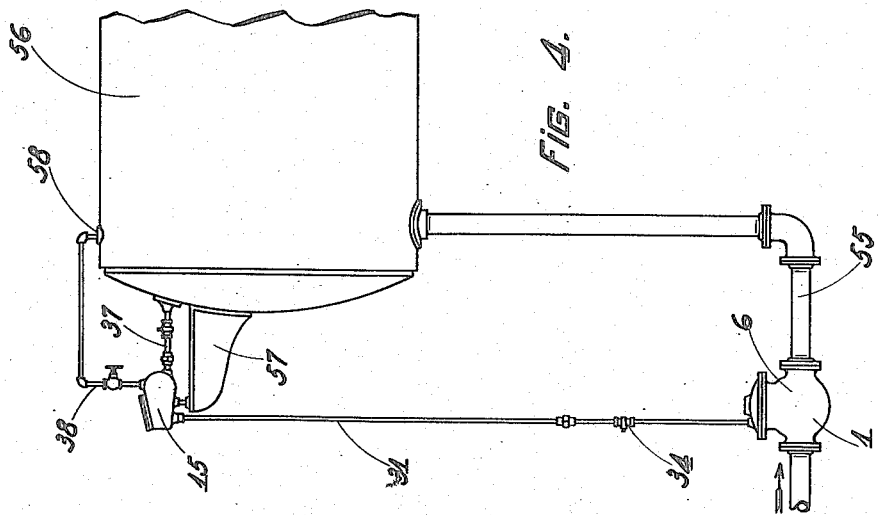

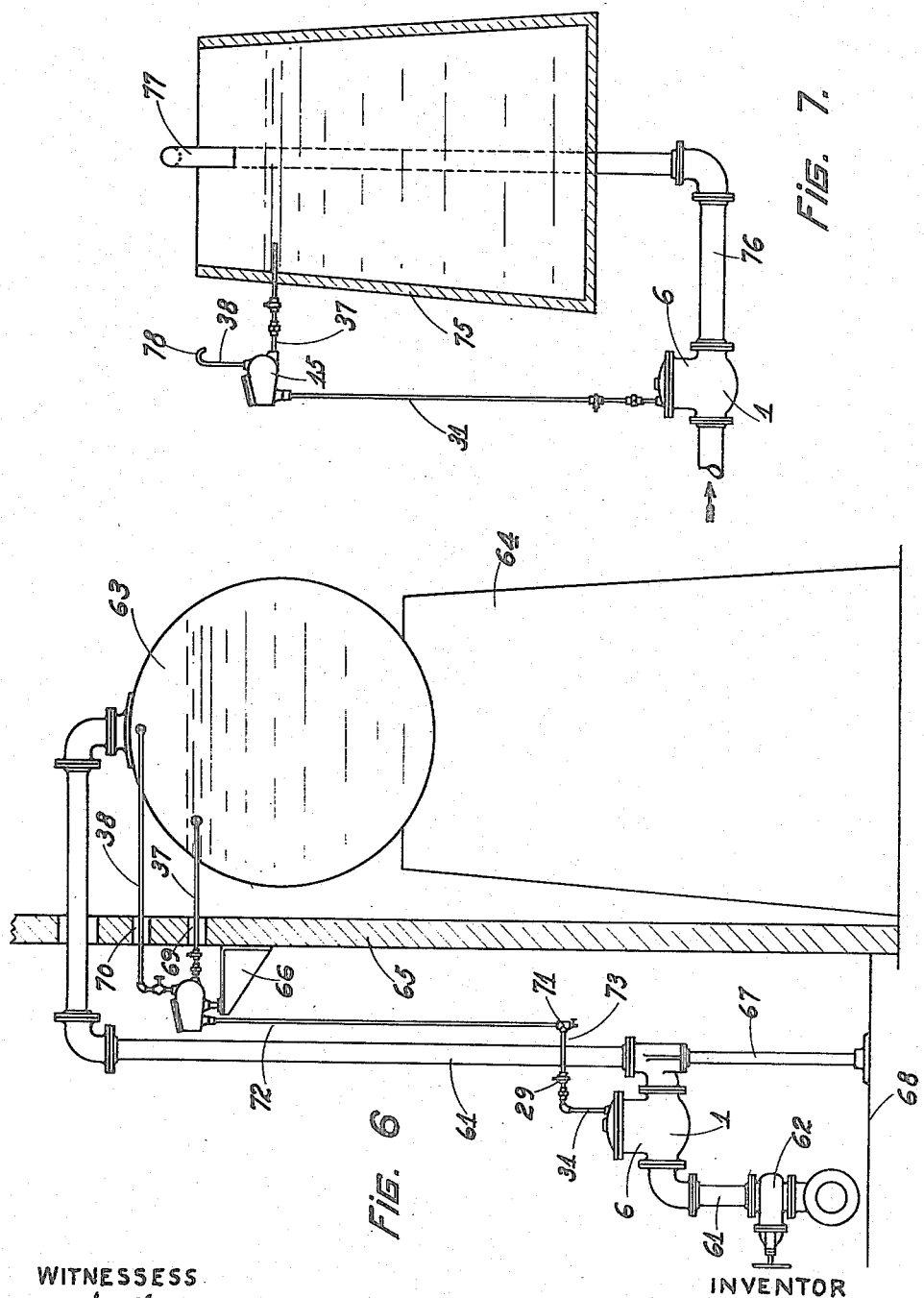

1,504,201

UNITED STATES PATENT OFFICE.

EDWARD V. ANDERSON, OF MONESSEN, PENNSYLVANIA, ASSIGNOR OF ONE-HALF TO CHARLES E. GOLDEN, OF CRAFTON, PENNSYLVANIA.

AUTOMATIC CONTROLLING VALVE FOR TANKS.

Application filed June 29, 1922. Serial No. 571,782.

*To all whom it may concern:*

Be it known that I, EDWARD V. ANDERSON, a citizen of the United States, and a resident of Monessen, in the county of Westmoreland and State of Pennsylvania, have invented a new and useful Improvement in Automatic Controlling Valves for Tanks, of which the following is a specification.

This invention relates to automatic controlling valves for tanks or other similar vessels, and particularly to the type intended to maintain a substantially constant level of liquid therein.

It is an object of the invention to provide a device in which all of the valves and auxiliary mechanism are located entirely outside of the vessel to be filled.

It is also an object to provide a valve controlled system which is float actuated and in which the float chamber may be vertically adjustable so as to readily adapt the same for maintaining various levels.

Further objects of the invention are to provide an apparatus in which the several working parts are easily accessible for replacement or repair, in which the several parts are so related and connected as to prevent waste of the liquid controlled, and in which substantially all water hammer and shocks are eliminated during operation thereof.

It is also a special object of the invention to provide a valve controlled apparatus which is adapted for various uses in which a substantially constant liquid level must be maintained regardless of the nature of the vessel being filled, that is, an apparatus equally adapted for the filling of tanks, vats, boilers or heaters, and open or closed containers.

It is a further special object of the invention to provide a float controlled valve which is compact, readily accessible, in which the valve element is not positively connected to the float but capable of independent movement thereof, in which the float element together with the entire valve mechanism, or the entire valve mechanism itself, can be readily removed from the float chamber as a unit.

It is still a further object of the invention to provide a float chamber having an inclined bottom portion and a valve cage mounted at the highest elevation of the bottom portion so as to avoid the disadvantages arising from the collection of sediment in the region of the valve proper.

In the accompanying drawings, Fig. 1 is a vertical sectional view, with parts in elevation, of the preferred embodiment of the invention showing the main valve and its controlling float mechanism disconnected from the vessel to be filled; Fig. 2 an enlarged fragmentary detail sectional view illustrating the construction and method of mounting the vent valve for venting the piston cylinder of the main valve to the float chamber; Fig. 3 a view similar to Fig. 1 illustrating a modified form of the invention; Fig. 4 an elevational view illustrating the invention as applied to a closed tank in which the liquid is fed thereto through its bottom; Fig. 5 an elevational view illustrating the invention applied to a heater or boiler; Fig. 6 a similar view showing the invention associated with a closed receptacle which is filled through its top; and Fig. 7 illustrates the invention as applied to an open vat.

The main control valve comprises a casing 1 having the usual inlet 2 and outlet 3 between which is disposed the diaphragm 4 provided with a port 5. The upper portion of the main valve casing is extended to form a piston cylinder 6 within which is positioned the combined lining and guide member 7. The element 7 extends completely from the upper end of the piston cylinder to the port 5 which it surrounds and is supported upon the diaphragm 4. Its upper portion 7' serves as a lining for the piston cylinder while its lower portion 7'' serves as a guide for the piston 8 mounted for reciprocation therein, the portion 7'' being provided with a series of openings permitting free passage of liquid therethrough and its extreme lower extremity being in the form of an annulus 7'''' functioning as a valve seat.

The bottom 9 of the hollow piston 8 forms the valve proper, the periphery of which cooperates with the seat formed by the annulus 7'''. Establishing communication between the space below the valve 9 and the interior of the piston cylinder is a bleed port 10. As clearly shown in Fig. 1, the area of the upper portion of the piston 8 is considerably greater than the area of the valve face subjected to the pressure of the liquid controlled thereby, and the dimensions of the piston valve are such as to leave a space 11 between the upper flanged portion 8' of the piston and the member 7 which is connected to atmosphere through the aperture 12.

Threaded in a boss on the top of the main valve casing is an upstanding hollow standard 13 for telescopically receiving a depending stem 14 attached to the float chamber 15, the stem 14 being slidable within the standard 13 and adapted to be fixed in any desired position by means of the set screws 16 and 16'. In this manner the float chamber 15 may be vertically adjusted to any desired elevation for maintaining various levels.

The bottom of the float chamber 15 gradually slopes downwardly from one side thereof, as clearly shown in Fig. 1, and is provided at its highest elevation with an opening 17 in which is fitted a cylindrical valve cage 18 provided with the exterior annular flange 19 adjacent its upper extremity and the exteriorly threaded portion 20 at its lower extremity. The flange 19 functions as a seating member abutting the floor of the float chamber surrounding the aperture 17 and is forced against its seat by means of the nut 21 engaging the threaded portion 20. The upper extremity of the cage 18 is interiorly flanged as at 22 to provide a valve seat with which a ball valve 23 disposed within the cage cooperates. The valve 23 is forced upwardly against its seat by a coil spring 24 the lower end of which rests upon an apertured plug 25 threaded within the lower portion of the cage 18. Fixed to one side of the upper portion of the valve cage 18 is an ear 26 to which is pivoted at 27 the inner end of a lever 28 having fixed to its outer end a float 29. The lower edge of the lever 28 is provided with an integral finger 30 which is adapted to contact the valve 23 to force the same from its seat whenever the float 29 falls due to the lowering of the level of the liquid within the float chamber.

A vent pipe 31 establishes communication between the interior of the piston cylinder 6 and the float chamber 15, the upper end of said vent pipe being connected by coupling 32 to the lower threaded extremity of the cage 18, and its lower end extending through an aperture 33 in the top of the main valve casing. In order to control the rate of flow through the pipe 31 or for the purpose of cutting off communication therethrough, the same is provided with the cut off valve 34.

The top of the float chamber 15 is provided with a manhole 35 closed by cover plate 36, the manhole being of considerable size so as to permit ready access to the interior of the chamber, and to permit the removal of the vent valve together with the actuating float as a unit. Leading from the bottom of the float chamber at one side thereof is the pipe 37 which establishes communication between the float chamber and a point below the normal level of the liquid in the vessel to be filled, while a pipe 38 connects the upper portion of the float chamber either to a point of the vessel to be filled above said normal level or to atmosphere, both said pipes being equipped with suitable cut off valves.

In the modified form of the invention shown in Fig. 3, the construction of the main valve is identical with that described above with the exception that instead of establishing communication through the bottom valve face of the piston 8 by means of a bleed port 10, a hollow apertured stem 40 is threaded within a central opening in the valve face and is provided with a plurality of reduced apertures 41 near its upper closed extremity, and the inlet to the stem 40 is screened by means of a foraminated disk 42 attached to the valve face. The top of the main valve housing is also provided with a central depending lug 43 which is adapted to be contacted by the upper closed end of the stem 40 to limit the upward movement of the valve. In this modified construction, a vent pipe 44 communicates with the upper portion of the piston cylinder which may either lead to any suitable point of waste, or to the float chamber, as in the preferred construction. Interposed in the pipe 44 is a valve 45, the stem of which is engaged by one end of a lever 46 connected through the link 47 to the float lever 48 having attached thereto the float 49, the link 47 being adjustable by means of a turn buckle designated at 50. The float lever 48 is pivoted directly to the float chamber 51 at 52 within an opening 53 establishing communication between the upper portion of the float chamber and the atmosphere. The float chamber 51 is connected at its bottom portion by means of a pipe 54 with the vessel to be filled at a point below the normal level of the liquid to be maintained therein.

Parts of the main control valve and the supporting means for the float chamber common to both forms, have not been redescribed in connection with the modified form shown in Fig. 3, corresponding parts being designated in the modified form by the reference numerals used in connection with the preferred form but with the addition thereto of the exponent "a."

In Fig. 4, the supply conduit in which the main control valve is located is designated by the reference character 55, being connected to the bottom of the closed tank 56 in which a substantially constant lev1 of liquid is to be maintained. Instead of supporting the float chamber 15 by means of the standard 13 and stem 14, the same is mounted upon a shelf or ledge 57 attached to one end of the tank 56. The pipe 37 establishes communication between the float chamber and the interior of tank 56 at a point below the liquid level to be maintained therein, while the pipe 38 connects said chamber to a point above the said level, entering the tank 56 through the top thereof as designated at 58.

Fig. 5 illustrates the preferred form of the invention as used in connection with a water heater or boiler 60. The supply conduit 59 discharges into the top of the boiler, and the float chamber is connected to points below and above the water level to be maintained therein by the pipes 37 and 38 respectively.

In Fig. 6, liquid is supplied through the conduit 61 provided with the gate valve 62 to the top of a closed tank 63 resting upon a suitable support 64. An upright wall 65 is located adjacent the tank 63 to which is attached the shelf or ledge 66 for supporting the float chamber in a manner similar to that described in connection with the arrangement illustrated in Fig. 4. In order to support the conduit 61, a vertical standard 67 resting upon the base of floor 68 is employed. The float chamber is connected by means of the pipes 37 and 38 to the tank 63 at points respectively above and below the level to be maintained therein, the said pipes extending through suitable openings 69 and 70 provided in the wall 65. The vent pipe 31 besides being provided with the usual cut-off valve 29 is also provided with the drain cock 71 which is located at the juncture between the upper depending vertical portion 72 and the horizontally extending portion 73 of the vent pipe.

In Fig. 7, the liquid is supplied to the open vat 75 by means of the conduit 76, the upper end 77 of which is bent downwardly and depends within the upper open end thereof. The float chamber is connected by pipe 37 to a point slightly below the level of the liquid to be maintained within the vat while the upper portion of the float chamber is maintained in communication with the atmosphere by means of the pipe 38 which in this instance does not lead to the vat itself but terminates in a downwardly curved end 78 to one side of the float chamber, the upper end 78 being extended above the level to be maintained in the vat.

Due to the connections of the float chamber, the same liquid level is maintained therein as in the vessel being filled, the vertical position of the float chamber being adjusted according to the level desired to be maintained. The parts are so arranged that when the level of the liquid reaches the desired high elevation the valve in the vent pipe will be closed, preventing escape of liquid from the piston cylinder. With the vent valve closed, the liquid from the supply conduit gradually flows through the bleed port 10 equalizing the pressures above and below the valve face. Due to the increased area of the piston 8, together with the weight of the parts, the main control valve gradually seats cutting off the flow through the supply conduit. During the seating movement of the main valve, water hammer or shocks due to impact of the parts is avoided due to the gradual escape of air through the aperture 12, thus assuring a gradual and gentle seating of the valve upon its seat.

Whenever the level of the liquid within the tank or vessel lowers, consequently causing a lowering of the level within the float chamber, the float 29 descends until the finger 30 contacts the valve 23 forcing it from its seat against the tension of spring 24. Opening of the vent valve 23 relieves the pressure within the piston cylinder, and consequently the pressure of the liquid below the valve face forces the main valve to its open position, and liquid is fed therethrough to the tank or vessel. During the opening movement of the main valve the liquid confined within the piston cylinder gradually escapes upwardly through the vent pipe into the float chamber. The venting of the piston cylinder therefore results in absolutely no waste of the liquid from the system. After sufficient liquid has been delivered to the tank or vessel to again restore the level to be maintained therein, the float 29 rises and lifts the finger 30 out of contact with the vent valve 23, permitting the same to seat under the tension of spring 24. As soon as the valve 23 seats, liquid from the supply conduit again gradually fills the piston chamber through the bleed port 10, in which event the main valve gradually closes to cut off further supply to the tank or vessel.

The rate of opening of the main valve may be controlled by varying the adjustment of the cut-off valve 34 interposed in the vent pipe 31. Whenever it is desirable to vary the level maintained in the tank or vessel being filled, it is merely necessary to adjust the elevation of the float chamber 15 which can be readily done by means of the vertically adjustable support afforded by the standard 13 and stem 14.

In the preferred construction shown in Fig. 1 due to the downward inclination of the bottom of the float chamber, and the disposition of the vent valve at the highest elevation thereof, the accumulation of sediment around or in the region of the vent valve is effectively prevented. The manhole 35 is of such size that whenever it is desirable to remove the vent valve after disconnecting the pipe 31 from the lower end of the cage 18 and removing the nut 21, the entire cage together with its attached parts, including the float and float lever, may be lifted upwardly through the opening 35.

In the preferred embodiment, due to the mounting of the float lever in the manner described, and due to the lack of positive mechanical connection between the float and vent valve, the said valve will be firmly seated at all times except when forced open by contact of the finger 30 therewith, and excessive downward movement of the float lever will be arrested by contact of the said lever with the upper extremity of the valve cage in this manner preventing undue injury to the float 37 caused by excessive lowering of the level of the liquid.

In the modified form illustrated in Fig. 3, the liquid from the supply conduit flows through the bore of the stem 40 and the reduced apertures 41, in equalizing the pressures below and above the valve whenever the vent valve 45 is closed, the foraminated disk 42 serving as a screen to prevent sediment or foreign matter from entering the lower open end of the stem 40. In this form, the float 49 rises and falls with the level of the liquid within the vessel to be filled, due to the connection of the float chamber 51 therewith through the pipe 54. Whenever the float 49 rises, due to the connection of the lever 48 through link 47 and lever 46, the vent valve 45 is positively and firmly forced to its seat to prevent escape of liquid from the piston chamber, in which event the main valve closes in a manner similar to that described in connection with the preferred form. When the float 49 falls due to the lowering of the level within the vessel being filled and within the float chamber 51, due to its mechanical connection with the vent valve, said valve is positively opened to permit escape of the liquid within the piston cylinder through pipe 44 either to waste or to the float chamber, as above described. Reduction of pressure within the piston chamber permits the pressure below the main valve to force the same to its open position, resulting in the delivery of liquid through the supply conduit to the tank or vessel being filled. The float chamber 51 may be adjusted to various heights, according to the level to be maintained, necessary adjustments in the length of the link 47 being secured by rotation of the turn buckle 50.

It is thus seen that the invention provides a simple and efficient means for maintaining a substantially constant level within a tank or vessel, regardless of whether the same is open or closed, and in which all of the controlling mechanism is readily accessible and located outside of the vessel being filled.

I claim:

1. The combination of a vessel to be filled, a supply conduit discharging thereinto, a main valve interposed in said supply conduit, a vertical standard fixed to the main valve housing, a float chamber in communication with the vessel and having a stem depending therefrom adjustably fixed to said standard whereby to vary the height thereof, a float disposed within the chamber, a vent pipe connecting the main valve housing above the valve therein with the float chamber, a normally closed vent valve in the vent pipe, said float being adapted to open the vent valve to relieve pressure above the main valve whenever the liquid in the float chamber reaches a predetermined low level.

2. The combination of a vessel to be filled, a supply conduit therefor, a main valve housing provided with an enlarged piston cylinder interposed in the supply conduit, an upwardly opening main valve having an attached piston disposed within the said valve housing adapted to be opened by the pressure of the liquid in the supply conduit, the body of the valve having a bleed port establishing communication from below the valve with the space above the piston, a float chamber separate and independent of the valve housing, said float chamber being mounted on the main valve housing and bodily adjustable in a vertical direction with respect thereto and in communication with the said vessel whereby the level of liquid in the chamber and vessel correspond, a float mounted therein, a vent pipe connecting the piston cylinder and float chamber, a normally closed vent valve in the vent pipe movable independently of the float, said float being adapted to contact the vent valve to open the same whenever the liquid in the chamber and vessel reaches a predetermined low level.

3. A float controlled valve comprising a float chamber provided with an inclined bottom portion having an opening therethrough at its highest point, a cylindrical valve cage removably fitted in said opening, the upper portion of the cage having an exterior flange providing a seating surface cooperating with said bottom and the lower portion of the cage being exteriorly threaded, a nut mounted on the threaded portion to bind the said flange upon its seat, the upper extremity of the cage being internally flanged to provide a valve seat, a downwardly opening valve housed within the cage, an apertured plug fixed within the lower portion of the cage, a spring interposed between the valve and said plug for urging the valve upwardly upon its seat, a pivoted float in the float chamber, a finger on the lever arm of the float adapted to contact the valve to open the same whenever the float reaches a predetermined low point.

4. A float controlled valve comprising a float chamber having its bottom provided with an opening extending therethrough, a cylindrical valve cage removably fitting the said opening, the upper portion of the cage being enlarged thereby providing a seating surface cooperating with the bottom surrounding the said opening, the lower portion of the cage having a diameter less than the said opening whereby to permit withdrawal of the cage upwardly through the opening, said lower portion of the cage being exteriorly threaded, a nut on the threaded portion to bind the said seating surface into intimate contact with the bottom of the float chamber, an inwardly projecting flange adjacent the upper extremity of the bore of the cage providing a valve seat, a removable apertured plug threadedly engaging the lower extremity of the said bore, a valve within the cage cooperating with the said valve seat, a coiled compression spring abutting at its opposite ends with the said valve and plug, respectively, a float lever pivotally mounted at the upper end of the said cage, a float attached to the said lever, and a projection on the said lever adapted to contact the said valve to actuate the same, the valve cage with its attached lever and float being removable as a unit from the opening in the float chamber.

In testimony whereof, I sign my name.

EDWARD V. ANDERSON.

Witnesses:
MICHAEL J. SKIRPAN,
RHODA ARMSTRONG.